United States Patent
Koci et al.

(10) Patent No.: US 8,594,909 B2
(45) Date of Patent: Nov. 26, 2013

(54) INTERNAL EXHAUST GAS RECIRCULATION FOR STOICHIOMETRIC OPERATION OF DIESEL ENGINE

(75) Inventors: Chad P. Koci, San Antonio, TX (US); Darius Mehta, San Antonio, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 281 days.

(21) Appl. No.: 13/175,847

(22) Filed: Jul. 2, 2011

(65) Prior Publication Data

US 2013/0000620 A1    Jan. 3, 2013

(51) Int. Cl.
*F02M 25/07* (2006.01)
*F02D 13/00* (2006.01)

(52) U.S. Cl.
USPC .... 701/108; 701/110; 123/90.15; 123/568.14

(58) Field of Classification Search
USPC ............. 701/108, 110; 123/568.14, 90.11, 123/90.15, 345–348, 436
See application file for complete search history.

(56) References Cited

U.S. PATENT DOCUMENTS 8,100,116 B2 * 1/2012 He et al. ................. 123/568.14

* cited by examiner

*Primary Examiner* — Hai Huynh
(74) *Attorney, Agent, or Firm* — Chowdhury & Georgakis PC; Ann C. Livingston

(57) ABSTRACT

A method of stoichiometrically operating a diesel-fueled internal combustion engine. A control unit is provide with stored data representing, within a range of exhaust valve timing or event modifications, an amount of fresh air flow and exhaust gas residuals resulting from each modification. During operation of the engine, the control unit is used to determine a desired amount of exhaust gas residuals for a given engine load; to access the stored data to determine a modification that will provide the desired amount of exhaust gas residuals; and to generate a control signal that will result in the desired modification.

6 Claims, 5 Drawing Sheets

INTERNAL EXHAUST GAS RECIRCULATION FOR STOICHIOMETRIC OPERATION OF DIESEL ENGINE

TECHNICAL FIELD OF THE INVENTION

This invention relates to diesel-fueled internal combustion engines, and more particularly methods for operating such engines stoichiometrically.

BACKGROUND OF THE INVENTION

Internal combustion engines are subject to strict emission limits. For diesel engines, which are conventionally run at a lean air-fuel ratio, the main pollutants of concern are oxides of nitrogen (NOx) and particulate matter (PM). The latter is composed of black smoke (soot), sulfates generated by sulfur in fuel, and components of unburned fuel and oil.

Efforts to control emissions from diesel engines have included equipping such engines with exhaust gas recirculation (EGR) systems. EGR works by recirculating a portion of an engine's exhaust gas back to the engine cylinders. In a diesel engine, the exhaust gas replaces some of the excess oxygen in the pre-combustion mixture. Because NOx forms primarily when a mixture of nitrogen and oxygen is subjected to high temperature, the lower combustion chamber temperature resulting from EGR reduces the amount of NOx that the combustion generates.

Efforts to control emissions have also led to efforts to operate diesel engines in stoichiometric, rather than lean modes. An advantage of stoichiometric engine operation is that NOx emissions are lower, and conventional three-way catalyst can be used for exhaust gas aftertreatment.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to reducing emissions by operating a diesel engine with a stoichiometric air-fuel ratio. Unlike methods of temporarily operating diesel engines stoichiometrically for purposes such as for regeneration of emissions control devices, the method described herein is directed to a diesel engine whose "normal" operation mode produces stoichiometric exhaust.

Conventional methods for operating internal combustion engines with stoichiometric air-to-fuel ratios have used throttling to reduce the intake manifold pressure to sub-atmospheric levels, especially under low engine load conditions. However, with a diesel engine, throttling is feasible only to a certain lower limit, at which ignition becomes unstable and eventually ceases. The reason for the unstable ignition is due to the lower density of the charge when fuel is injected. At too low a density and temperature, the fuel injection spray will not vaporize and ignite, resulting in misfire. An alternative to throttling for low load operation must be used if a diesel engine is to be operated stoichiometrically across its entire operating range.

A feature of the stoichiometric engine operation methods described below is that they make use of internal exhaust gas recirculation (iEGR). In general, iEGR is implemented by having a percentage of exhaust gases remain in the cylinders of the engine from one combustion cycle to another. The exhaust gas that remains in the cylinder mixes with intake air in the next engine cycle.

As described below, for purposes of the present description, engine valve and camshaft modifications are used to trap internal exhaust gas (iEGR) in higher than normal amounts for stoichiometric diesel engine operation. Increasing the internal EGR allows for lower fresh air flow rates to achieve the same intake manifold pressures and temperatures. The reduced fresh air flow in turn reduces the amount of fuel that can be injected when operating at stoichiometric air-to-fuel ratios. This enables lower engine loads to be reached under stoichiometric air-to-fuel ratios, than with normal internal EGR levels and intake manifold throttling. Low fresh air flow rates (low loads) can be achieved with sufficient engine cylinder thermodynamic conditions for stoichiometric diesel combustion without the use of an external EGR system.

One method for providing iEGR is by providing negative valve overlap (NVO). In NVO, both the intake and exhaust valves are closed during a predetermined crank-angle period in the piston stroke region. This period is during the end of the exhaust stroke and the beginning of intake stroke, and is referred to herein as a "negative valve overlap period".

Figure 1:
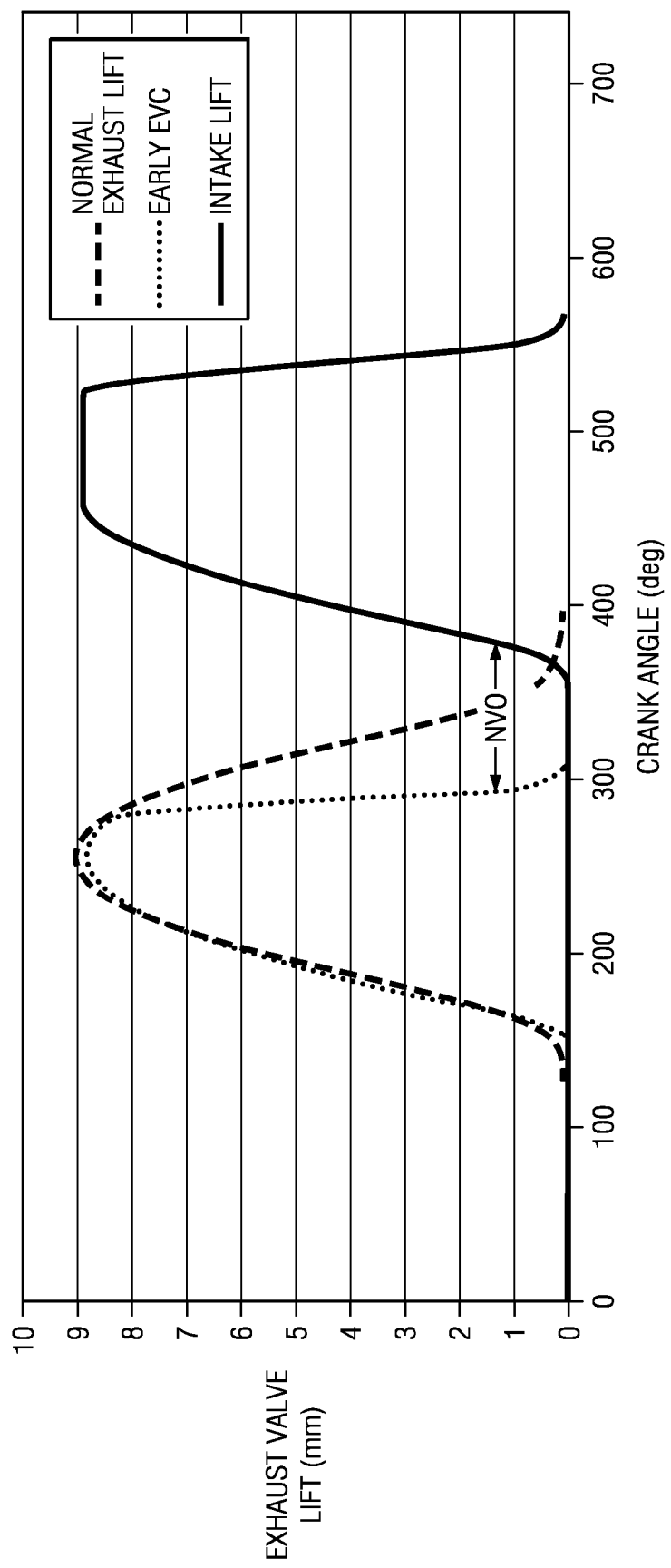
FIG. 1 illustrates how internal exhaust gas recirculation (iEGR) may be produced with early exhaust valve closing.

FIG. 1 illustrates an example of NVO achieved with early exhaust valve closing (EVC). Exhaust valve lift is shown as a function of crank angle degrees. The solid line represents normal intake valve lift. The dashed line represents normal exhaust valve lift. The dotted line represents early exhaust valve closing, resulting in an NVO period. In the example of FIG. 1, the NVO period is between about 300 and 360 crank angle degrees.

Figure 2:
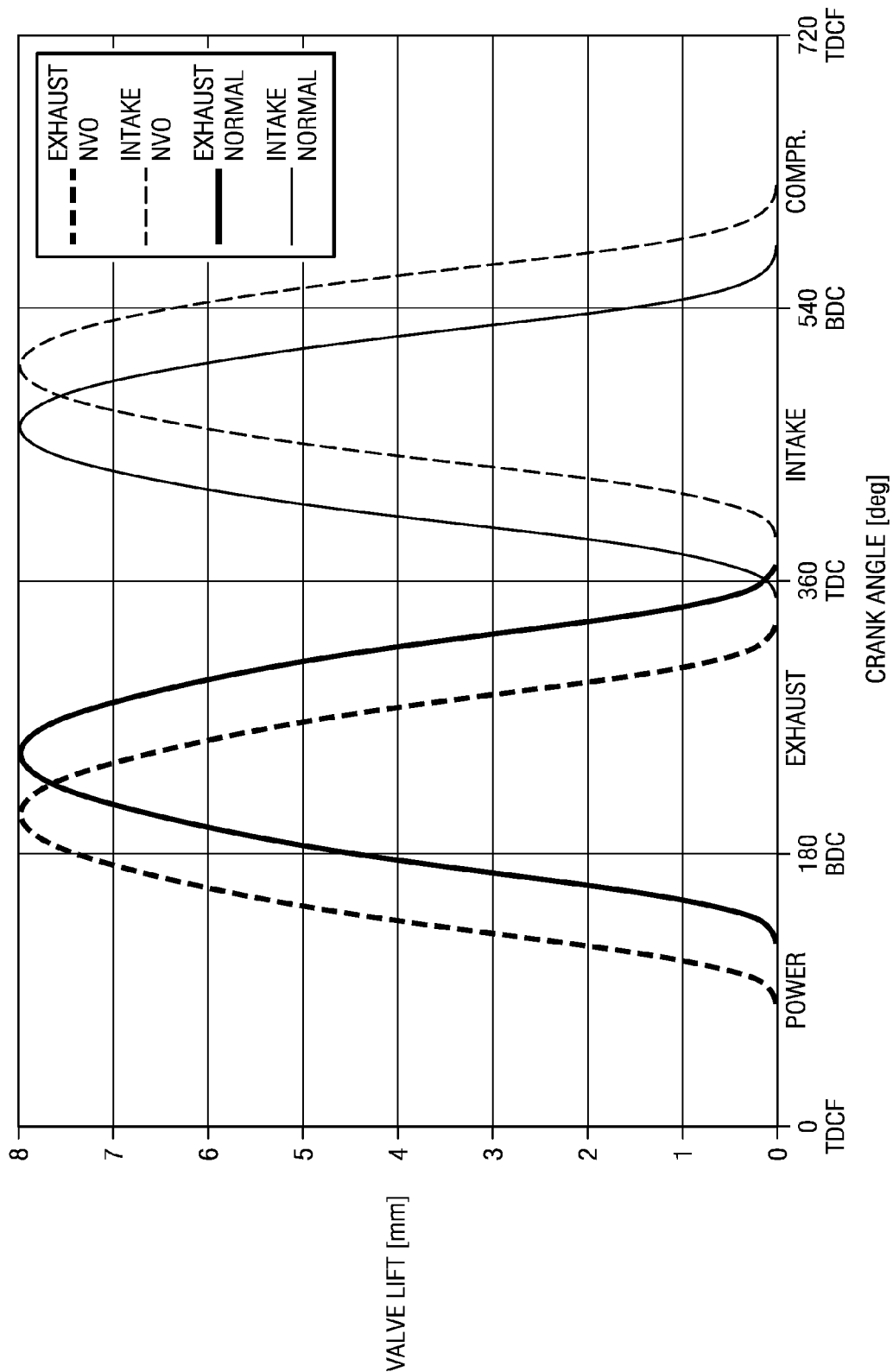
FIGS. 2 and 3 illustrate how internal exhaust gas recirculation (iEGR) may be produced by modifying exhaust and intake valve cam phasing.
Figure 3:
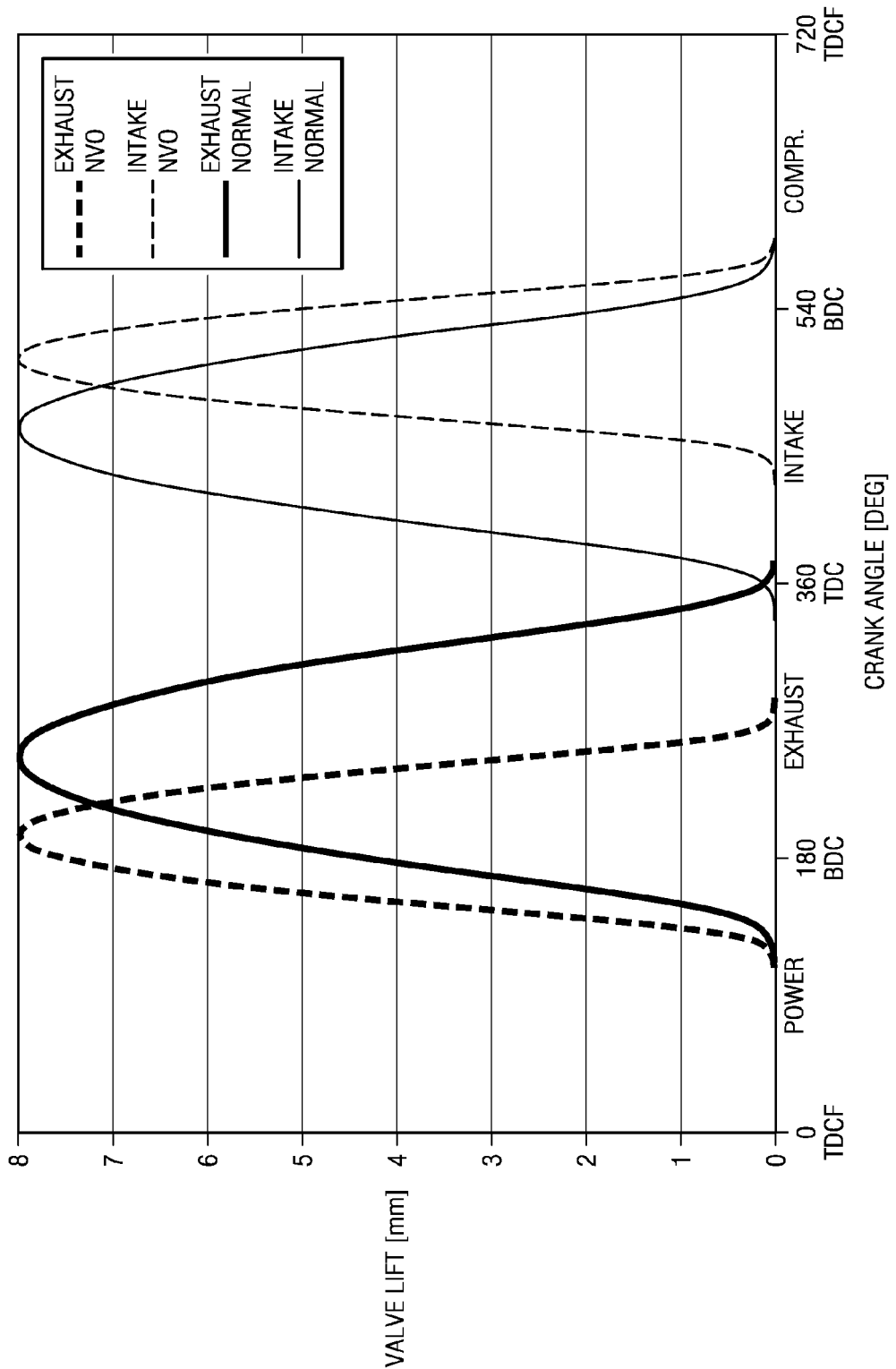

FIGS. 2 and 3 illustrate examples of NVO achieved with intake and exhaust valve cam phasing. Both intake and exhaust valve lift are shown as a function of crank angle degrees. The solid lines represent normal exhaust and intake lift. The dotted lines represent the result of modified valve cam phasing to achieve NVO.

As illustrated the exhaust valve lift is advanced and the intake valve lift is delayed. The resulting NVO is generally centered near 360 crank angle degrees (TDC). In FIG. 2 the NVO period is shorter than in FIG. 3, as a result of a different cam phase modification.

Figure 4:
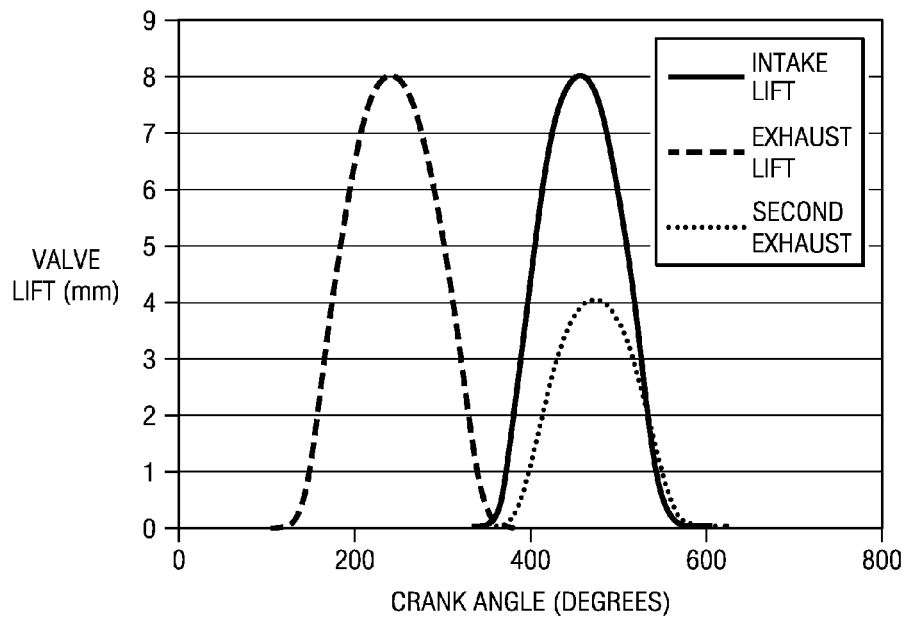
FIG. 4 illustrates how internal exhaust gas recirculation (iEGR) may be produced with a second exhaust valve lift event.

As illustrated in FIG. 4, another method for achieving iEGR is with exhaust re-breathing using a second exhaust valve lift event. As indicated by the dotted lines, the second exhaust lift event occurs during the intake lift cycle. In the example of FIG. 4, the secondary exhaust lift event generally coincides with the intake lift. In general, it will be within the intake lift period, but may be for a shorter duration.

Also, in the example of FIG. 4, the secondary exhaust lift is about half as much as the normal exhaust valve lift and is centered about the same as the peak intake valve lift.

As is the case with negative valve overlap, during the second exhaust lift period, exhaust gas is trapped in-cylinder and mixes with intake air. The "range" of the secondary exhaust lift event (i.e., its start time in terms of crank angle degrees) could be adjusted depending on how much exhaust is desired to be trapped. Generally, this range will be such that the secondary exhaust valve lift begins during the intake lift event.

In a manner analogous to performing a secondary exhaust valve lift event, iEGR can be achieved with a secondary intake valve lift event. In this case, the intake valve is opened during the exhaust stroke. The timing of this secondary intake valve lift, like that of the secondary exhaust valve lift event illustrated in FIG. 4, would be such that the lift generally coincides with, or is within, the profile of the exhaust valve lift. Exhaust is pushed into the intake manifold and stored until the intake stroke, at which time it is re-inducted.

Figure 5:
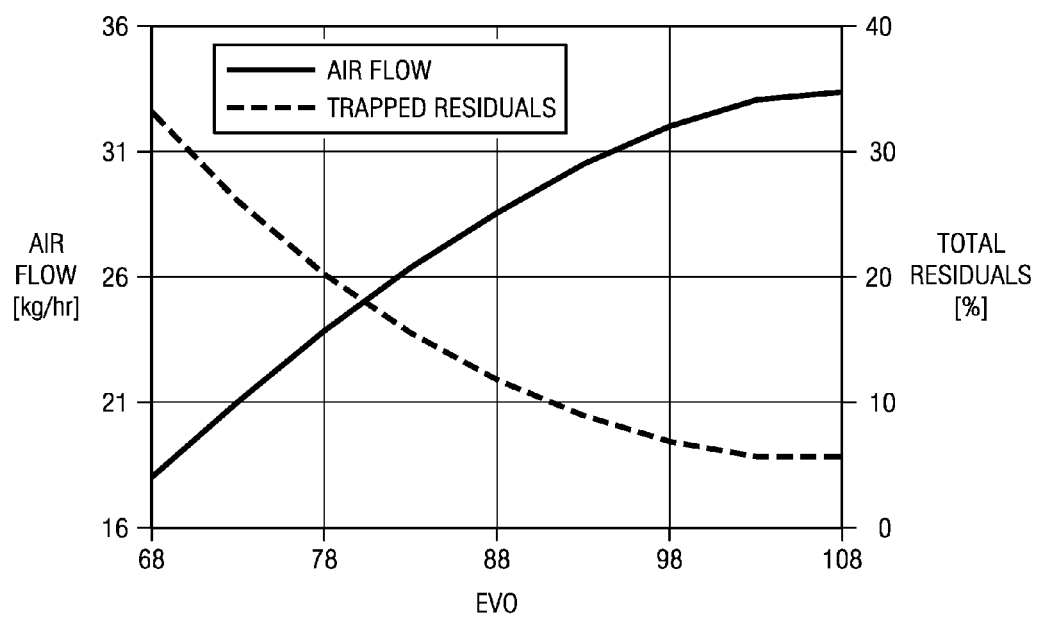
FIG. 5 illustrates air flow rate and exhaust residuals with cam phase modification.

FIG. 5 illustrates both in-cylinder fresh intake air flow rate and exhaust residuals as a function of exhaust valve opening position (in crank angle degrees). Constant intake manifold conditions (pressure and temperature) are assumed. Air flow is shown as a solid line, and exhaust residuals as a dashed line.

Referring again to FIGS. 2 and 3, it can be seen that a "normal" exhaust valve opening begins at about 108 crank angle degrees. In the example of FIG. 2, the advanced exhaust valve lift begins at about 68 crank angle degrees. In the example of FIG. 3, the exhaust valve lift begins at about 100 crank angle degrees.

In the example of FIG. 5, exhaust valve lift phase modification has a range of about 40 crank angle degrees. That is, the lift phase may be modified anywhere from a 68 degree exhaust valve opening to a 108 degree exhaust valve opening. As illustrated, as the exhaust valve lift modification is advanced from "normal", the in-cylinder air flow decreases. At the same time, the in-cylinder residuals increase. As stated above, increasing the iEGR allows for lower fresh air flow rates to achieve the same intake manifold pressures and temperatures.

Increasing the amount of internal EGR (iEGR) will displace fresh air inducted into the engine and allow for lower engine loads to be reached at stoichiometric air-to-fuel ratios than could otherwise be achieved without iEGR. Internal EGR optimization for stoichiometric operation of a particular engine will involve finding the optimum crank angle at which valve cam phase modification will result in a desired proportion of fresh air flow and residuals.

Exhaust valve opening at a sufficiently early crank angle position will result in a sufficient amount of fresh air being displaced so as to substantially reduce or avoid the need for throttling to achieve stoichiometric operation. Similarly when iEGR is achieved with early exhaust valve closing (FIG. 1) or a second exhaust lift event (FIG. 4), timing of these events can be optimized so that the fresh air displaced by exhaust residuals will reduce or eliminate the need for throttling.

Figure 6:
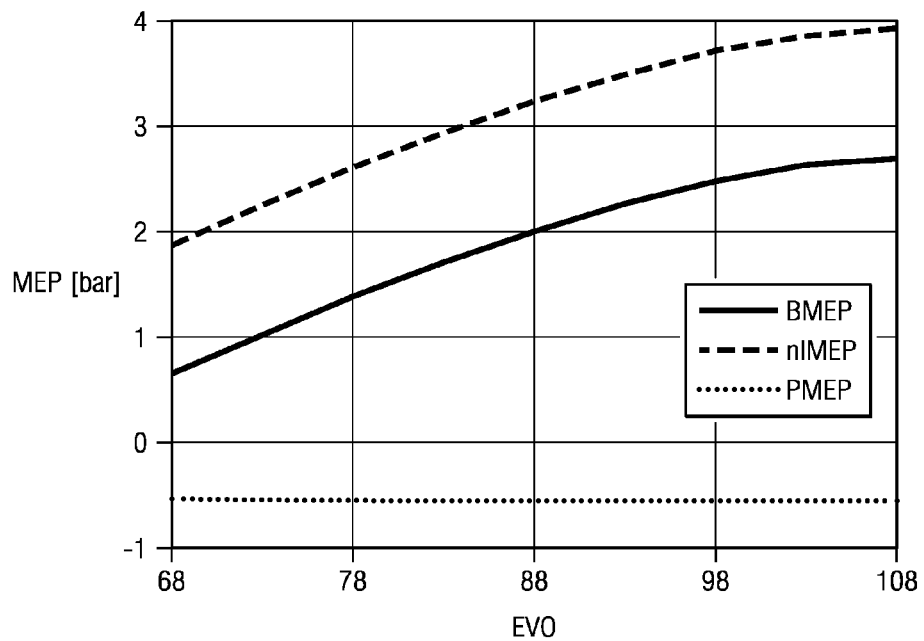
FIG. 6 illustrates mean effective pressure with cam phase modification.

FIG. 6 illustrates in-cylinder mean effective pressure (MEP) as a function of early exhaust valve opening. It further illustrates how increased iEGR reduces achievable engine loads under stoichiometric combustion and constant intake manifold conditions. As in FIG. 5, "early" exhaust valve opening occurs anywhere within in a range of 68 to 108 crank angle degrees. "Mean effective pressure" is used in its common meaning as the mean theoretical piston-top pressure of an engine. Both the Brake MEP (BMEP) and the net indicated (nIMEP) MEP decrease with early exhaust valve opening. The pumping MEP (PMEP) is not affected.

The use of iEGR will promote ignition in diesel engines at low-load stoichiometric conditions due to the increased cylinder charge density. Also, the higher cylinder charge temperature from the iEGR than that of only fresh air will help promote fuel vaporization and therefore increase the auto-ignition propensity of the fuel spray.

Figure 7:
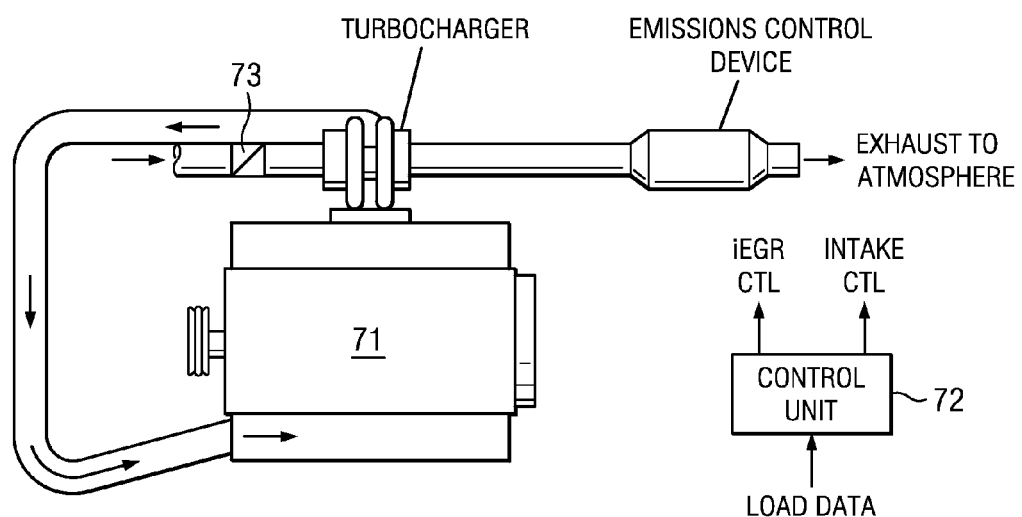
FIG. 7 illustrates an engine having a control unit programmed to adjust iEGR in response to engine load conditions.

FIG. 7 illustrates a diesel engine 71 having a control unit 72 programmed to implement an engine control strategy for operating the engine stoichiometrically, especially at low loads. Control unit 72 is typically a processor-based control unit, having hardware and software programmed to perform the tasks described herein. Control unit 72 may be part of a more comprehensive engine control unit.

Initially, for a given engine, the relationship of fresh air flow to exhaust residuals when iEGR is implemented is established. A relationship such as that of FIG. 5 can be established, for a range of valve phasing, lift, or valve event modifications. Each modification (typically expressed in terms of crank angle degrees) results in a given proportion of fresh air to trapped exhaust residuals. A map of data representing this relationship, or other form of data, is stored in control unit 72.

During engine operation, for a given load, it can be determined how much fresh air and how much in-cylinder exhaust is required for stoichiometric engine operation. The stored data can be accessed to determine an "iEGR control signal".

The "iEGR control signal" could be for early exhaust valve closing (FIG. 1), cam phasing adjustment (FIGS. 2 and 3) or a second exhaust valve lift event (FIG. 4). For example, referring again to FIG. 5, a desired fresh air and iEGR proportion would map to a certain crank angle phase adjustment for exhaust valve opening.

For stoichiometric operation, the desired amount of throttling, if any, is also determined. The control unit 72 delivers an intake control signal to the throttle 73 and an iEGR control signal to the appropriate valve actuator(s).

In summary, sufficient iEGR for stoichiometric operation can be enabled through modified valve phasing, lift, or the addition of valve events. This use of iEGR reduces pumping work and increases engine efficiency over intake manifold throttled operation.

What is claimed is:

1. A method of stoichiometrically operating a diesel-fueled internal combustion engine, comprising:
   providing an engine control unit having stored data representing, within a range of early exhaust valve closing timing modifications, an amount of fresh air flow and exhaust gas residuals resulting from each modification;
   during operation of the engine, providing a stoichiometric air-fuel ratio to the engine;
   during operation of the engine, using the engine control unit to perform the following tasks: determining a desired amount of exhaust gas residuals for a given engine load; accessing the stored data to determine a desired exhaust valve lift modification that will provide the desired amount of exhaust gas residuals; and generating a control signal that will result in the desired exhaust valve lift modification
   wherein the desired amount of exhaust gas residuals is predetermined to displace fresh air that would otherwise be inducted into the engine, to allow stoichiometric operation at the same intake manifold pressure and temperature as when fresh air is not displaced.

2. A method of stoichiometrically operating a diesel-fueled internal combustion engine, comprising:

providing an engine control unit having stored data representing, within a range of intake and exhaust valve phase modifications, an amount of fresh air flow and exhaust gas residuals resulting from each modification;

during operation of the engine, providing a stoichiometric air-fuel ratio to the engine;

during operation of the engine, using the engine control unit to perform the following tasks: determining a desired amount of exhaust gas residuals for a given engine load; accessing the stored data to determine a desired intake and exhaust valve phase modification that will provide the desired amount of exhaust gas residuals; and generating a control signal that will result in the desired intake and exhaust valve phase modification wherein the desired amount of exhaust gas residuals is predetermined to displace fresh air that would otherwise be inducted into the engine, to allow stoichiometric operation at the same intake manifold pressure and temperature as when fresh air is not displaced.

3. A method of stoichiometrically operating a diesel-fueled internal combustion engine, comprising:

providing an engine control unit having stored data representing, within a range of times of secondary exhaust lift events, the amount of fresh air flow and exhaust gas residuals resulting from each event;

during operation of the engine, providing a stoichiometric air-fuel ratio to the engine;

during operation of the engine, using the engine control unit to perform the following tasks: determining a desired amount of exhaust gas residuals for a given engine load; accessing the stored data to determine a desired time of a secondary exhaust valve lift that will provide the desired amount of exhaust gas residuals; and generating a control signal that will result in the desired secondary exhaust valve lift wherein the desired amount of exhaust gas residuals is predetermined to displace fresh air that would otherwise be inducted into the engine, to allow stoichiometric operation at the same intake manifold pressure and temperature as when fresh air is not displaced.

4. The method of claim 3, wherein the secondary exhaust lift is about half as much as the normal exhaust valve lift.

5. The method of claim 3, wherein the secondary exhaust lift event range is from about 380 to 580 crank angle degrees.

6. A method of stoichiometrically operating a diesel-fueled internal combustion engine, comprising:

providing an engine control unit having stored data representing, within a range of times of a secondary intake valve lift, the amount of fresh air flow and exhaust gas residuals resulting from each event period;

during operation of the engine, providing a stoichiometric air-fuel ratio to the engine;

during operation of the engine, using the engine control unit to perform the following tasks: determining a desired amount of exhaust gas residuals for a given engine load; accessing the stored data to determine a desired time of a secondary intake valve lift that will provide the desired amount of exhaust gas residuals; and generating a control signal that will result in the desired secondary intake valve lift wherein the desired amount of exhaust gas residuals is predetermined to displace fresh air that would otherwise be inducted into the engine, to allow stoichiometric operation at the same intake manifold pressure and temperature as when fresh air is not displaced.

\* \* \* \* \*